Nov. 1, 1966  R. B. HAILSTONE  3,282,722
METHOD OF FLAME TREATING POLYVINYL BUTYRAL
AND THE PRODUCT THEREOF
Filed July 22, 1963  3 Sheets-Sheet 1

FIG. I

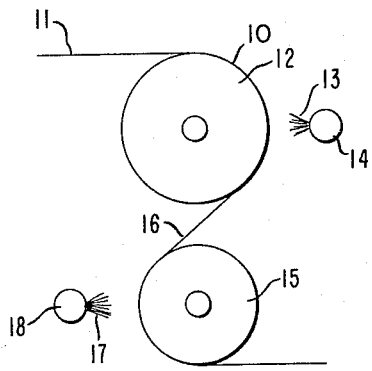

FIG. IIA

CLEAN PLATE GLASS

FIG. IIE

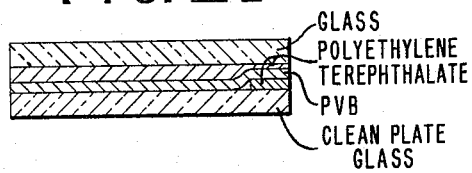
GLASS
POLYETHYLENE TEREPHTHALATE
PVB
CLEAN PLATE GLASS

FIG. IIB

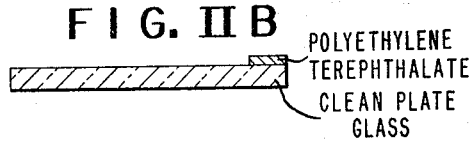
POLYETHYLENE TEREPHTHALATE
CLEAN PLATE GLASS

FIG. IIF

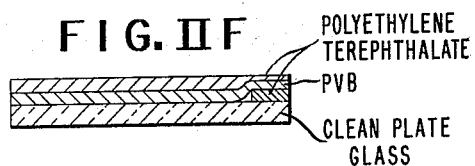
POLYETHYLENE TEREPHTHALATE
PVB
CLEAN PLATE GLASS

FIG. IIC

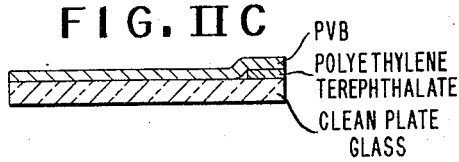
PVB
POLYETHYLENE TEREPHTHALATE
CLEAN PLATE GLASS

FIG. IIG

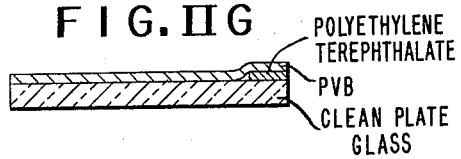
POLYETHYLENE TEREPHTHALATE
PVB
CLEAN PLATE GLASS

FIG. IID

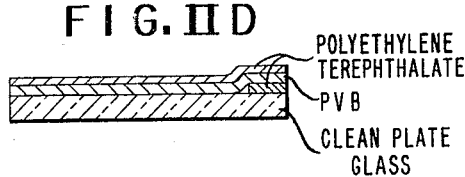
POLYETHYLENE TEREPHTHALATE
PVB
CLEAN PLATE GLASS

FIG. IIH

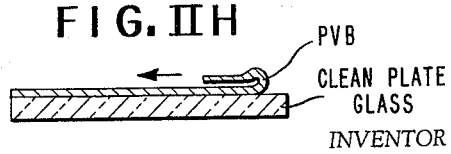
PVB
CLEAN PLATE GLASS

INVENTOR
ROBERT B. HAILSTONE

BY Earl L. Hondley

ATTORNEY

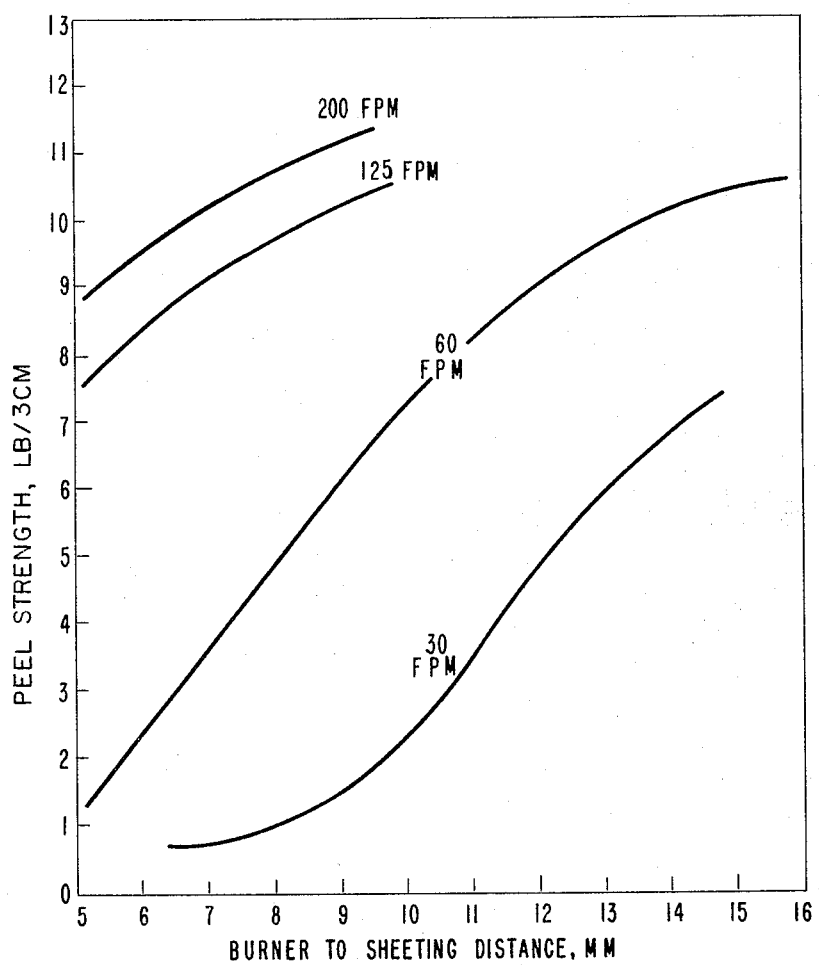
FIG. III

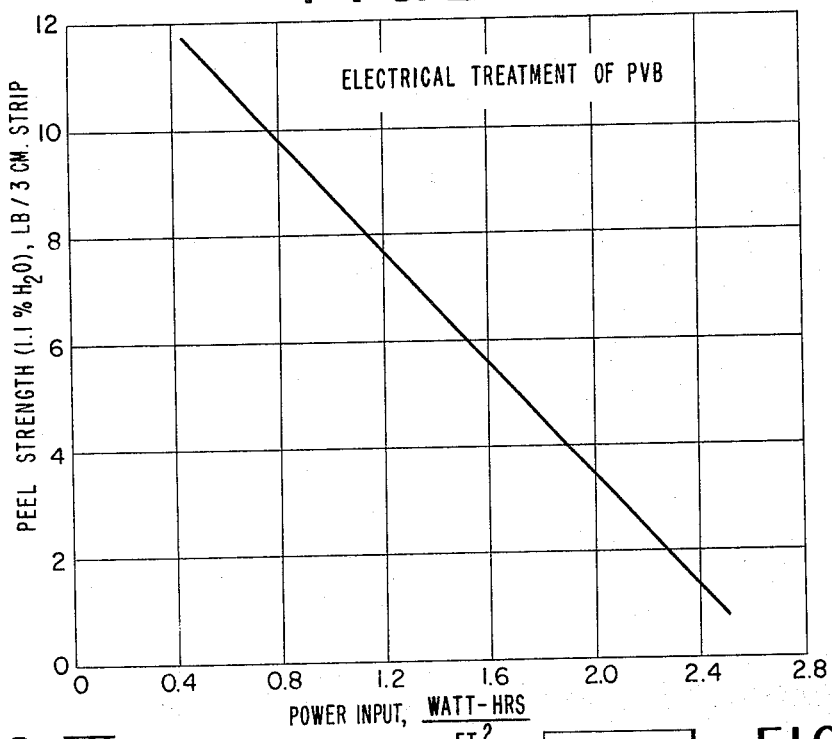
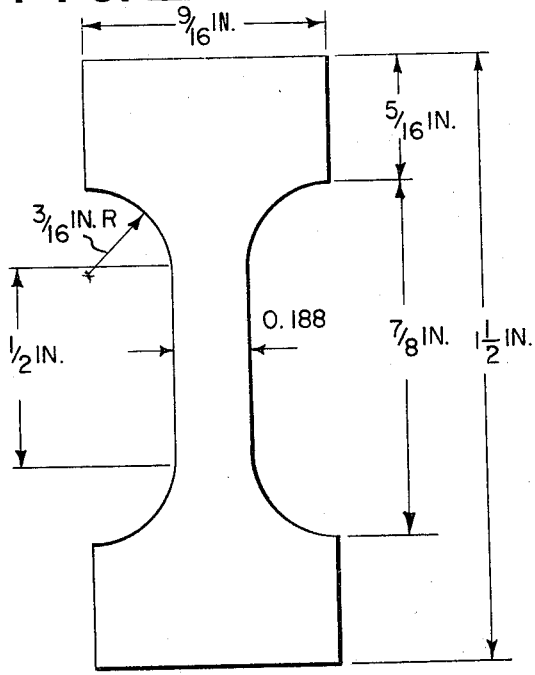
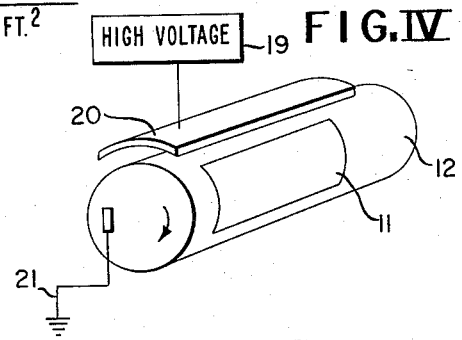
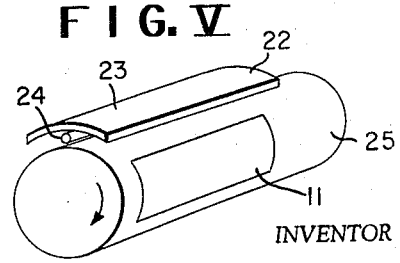

United States Patent Office 3,282,722
Patented Nov. 1, 1966

3,282,722
METHOD OF FLAME TREATING POLYVINYL BUTYRAL AND THE PRODUCT THEREOF
Robert Burleigh Hailstone, Wilmington, Del., assignor to E. I. du Pont de Nemours and Company, Wilmington, Del., a corporation of Delaware
Filed July 22, 1963, Ser. No. 296,655
8 Claims. (Cl. 117—16)

This invention relates to an improved polyvinyl butyral sheeting for use in laminated safety glass and, more specifically to sheeting which when it contains relatively low amounts of moisture may be laminated to form safety glass having a high resistance to penetration. This invention also relates to a sheeting that may have a wide range in moisture content, and yet when laminated to form safety glass provides a product having high resistance to penetration. This invention also relates to a polyvinyl butyral sheeting which has improved handling characteristics because of the reduced tendency of the sheeting to adhere to itself when stored in rolls or stacks. In addition, this invention relates to a method for treating polyvinyl butyral sheeting to produce an interlayer for safety glass having these desirable characteristics, and, more specifically, to flame, electrical discharge or infrared radiation treatment of polyvinyl butyral sheeting. This invention also relates to laminates produced using the improved polyvinyl butyral sheeting of this invention, and more particularly, to windshields and the like, containing the improved sheeting.

It is known to employ plasticized polyvinyl butyral sheeting as an interlayer for safety glass. It is also known that the adhesion of the sheeting to the glass is related to the moisture content of the sheeting and that resistance to petnetration of the safety glass laminate is related to the adhesion between the sheeting and the glass.

The relationship between moisture content of the sheeting and resistance to penetration of a laminate can be readily demonstrated if the resistance to penetration of a safety glass laminate prepared using a sheeting containing 0.3 percent by weight water is compared with the resistance to penetration of a laminate prepared from a sheeting containing about 1.6 percent by weight water. The resistance penetration of the laminate containing 0.3 percent water will be markedly less. However, the use of high moisture content sheeting is not entirely satisfactory since the high moisture content makes the sheeting more susceptible to the formation of bubbles, and also reduces the stiffness of the sheeting and increases its tackiness, thus adversely affecting the handling characteritics of the sheeting.

It is also known that the adhesion of the interlayer to the glass can be decreased by synthesizing polyvinyl butyral having a lower hydroxyl content, i.e., a smaller amount of unreacted polyvinyl alcohol present in the resin chain. However, this reduction in adhesion between the glass and interlayer does not significantly affect the resistance to penetration of the laminate, for by reducing the hydroxyl content, the tensile strength of the interlayer is reduced, thereby substantially cancelling any improvement in resistance to penetration obtained by the decrease in adhesion.

It is an object of this invention to provide a polyvinyl butyral sheeting that may be laminated to form safety glass having a high resistance to penetration even when the sheeting has a low moisture content. It is a further object of this invention to provide a plasticized polyvinyl butyral sheeting that may have a wide range of moisture content, and yet when laminated to form safety glass, provides a product having a high resistance to penetration. A further object of this invention is to provide a plasticized polyvinyl butyral sheeting which has a decreased tendency to block. It is a further object of this invention to provide a plasticized polyvinyl butyral interlayer which has a low adhesion to glass. Another object of this invention is to provide methods for the production of the plasticized polyvinyl butyral sheeting which exhibits the above desirable characteristics. A further object of this invention is to provide a windshield containing the improved interlayer of this invention. Other objects will be apparent to one skilled in the art from the remainder of the specification.

It has been discovered that the above objects can be achieved by subjecting plasticized polyvinyl butyral sheeting to flaming, electrical discharge or infrared radiation treatment.

In the drawing, FIGURE I diagrammatically illustrates a flame treatment apparatus that may be used to carry out the process of this invention.

FIGURE II shows diagrammatically the steps of laminating the sheeting of this invention for testing the adherence of the sheeting to glass.

FIGURE III graphically shows the results of flame treating the sheeting of this invention at different speeds and at different sheeting to burner distances.

FIGURE IV shows diagrammatically an apparatus that may be used to treat the sheeting by electrical discharge.

FIGURE V shows diagrammatically an apparatus that may be used to treat the sheeting by infrared radiation.

FIGURE VI shows the shape of a test sample for testing the tensile strength of polyvinyl butyral sheeting.

FIGURE VII graphically shows how power input typically is related to peel strength in an electrical discharge treated sample.

As shown in the drawing, FIGURE I, plasticized polyvinyl butyral sheeting 11 is fed from an extruder or other source not shown, over internally cooled roller 12, where the outer surface 10 is exposed to a flame 13 emanating from the gas manifold 14. The sheeting 11 then passes around internally cooled roller 15 where the reverse surface 16 is exposed to flame 17 emanating from gas manifold 18. One or the other of gas manifolds 14 or 18 is not used if only one side of the sheeting is to be treated.

In FIGURE IV plasticized polyvinyl butyral sheeting 11 is mounted on internally cooled roller 12, by means of suitable adhesive strips, not shown. The roller electrode is grounded by means 21. High voltage 19 is applied from a source to internally cooled electrode 20, shown in the drawing to be shaped, but not necessarily shaped. In the preferred embodiment, electrode 12 and sheeting 11 are separated by a thin buffer layer of high dielectric strength material such as a 4 to 6 mil film of polyethylene terephthalate sold under the trademark "Mylar," not shown.

In FIGURE V plasticized polyvinyl butyral sheeting 11 is mounted on an internally cooled roller 25 by means of suitable adhesive strips, not shown. Infrared heater 22 comprising reflector 23, and heater element 24 is supplied with a suitable source of electrical power not shown.

It is not fully understood what change in the surface takes place during treatment of the sheeting, for chemical analysis and physical testing indicate that only a very thin layer between about 50 and 5000 Angstroms thick is affected by the treatment. Because of the thinness of the affected layer, precise chemical and physical analyses are very difficult to obtain. It has been found that a greater amount of material insoluble in p-dioxane, methanol, and dimethylformamide is found in the affected surface layer than is present in the bulk of the sheeting. Examination of this insoluble material from the surface of the sheeting by infrared absorption analysis indicates increased absorption at a wavelength of 5.77 microns, which is characteristic of increased ester carbonyl content. Similar evidence is obtained through examination of the surface of the treated sheeting with attenuated total reflectance infrared absorption techniques. In any event the change in the surface is measurable in terms of the adhesion of the treated sheeting to glass, and in terms of the tendency of treated sheeting to block.

Tensile strength of the sheeting is not substantially affected by the surface treatment of this invention. To measure tensile strength, the following procedure was employed. The sample to be tested is conditioned at 50 percent relative humidity for 12 hours. The sample is then placed between two 5 mil thick sheets of polyethylene terephthalate, and this sandwich is then placed between two sheets of 0.125 inch thick glass. This glass, polyethylene terephthalate, polyvinyl butyral laminate is then autoclaved in an oil autoclave at a pressure of 225 p.s.i. for 30 minutes at 150° C. The glass and the polyethylene terephthalate are then removed. The polyvinyl butyral sample is then cut to the shape shown in FIGURE VI. The sample is maintained at 50 percent relative humidity as the tensile strength is measured in a conventional tensile test machine, such as an Instron. The cross head speed of the machine is set at 20 inches per minute. The tensile strength is calculated by the following formula:

tensile strength, p.s.i. =

$$\frac{\text{breaking force in pounds}}{(\text{Specimen thickness in inches}) (0.188 \text{ inch width})}$$

There is a definite relationship between the adherence to glass of an interlayer of a given tensile strength and the resistance to penetration of the glass laminate, i.e., the energy absorption capacity of the laminate. It is believed that a low adherence of the interlayer to the glass allows the interlayer to separate from the glass laminate in areas adjacent to cracks when the laminate is subjected to sufficient impact to break the glass; consequently, the interlayer gives or stretches adjacent to the point of impact due to a pulling of the interlayer from between the glass in a small area adjacent to the cracks emanating from the point of impact. Thus the impact is absorbed in a much larger area of interlayer than it would be if the glass were more firmly bound to the polyvinyl butyral.

In order to equate the adherence of polyvinyl butyral to the surface treatment, the following adherence test was devised. A 12 in. x 12 in. sheet of plate glass is thoroughly cleaned with detergent and thoroughly washed with demineralized water (FIGURE IIa). A 1 mil polyethylene terephthalate film 12 in. x 12 in. is placed across the width of the glass at one end (FIGURE IIb). A 12 in. x 12 in. sheet of polyvinyl butyral of known thickness having a predetermined moisture content is then placed on top of the glass in such a manner that it overlapped the polyethylene terephthalate film (FIGURE IIc). A 5 mil 12 in. x 12 in. sheet of polyethylene terephthalate is then placed over the polyvinyl butyral (FIGURE IId). A 12 in. x 12 in. sheet of glass is then placed over the polyethylene terephthalate film (FIGURE IIe). The resulting laminate is run through nip rolls at a pressure of 53 lbs./linear inch of width at room temperature, heated to 50° C. by placing it for 1 minute in a 200° C. circulating air oven, passed again through nip rolls, heated to 90° C. by placing it in a circulating air oven for 3 minutes at 200° C., passed through nip rolls and autoclaved in oil for 30 minutes at 150° C. and 225 p.s.i.g. The glass cover is removed, the specimen is washed free of oil, and held at constant temperature of 22° C. for 8 hours (FIGURE IIf). The 12 in. x 12 in. sheet is then cut into strips 3 cm. wide and 12 in. long. The upper layer of polyethylene terephthalate is removed, (FIGURE IIg) and the peel strength determined by peeling the interlayer at a temperature of 22° C. from the glass at an angle of 180° using an Instron testing machine at a cross-head speed of 20 in./min. (FIGURE IIh). Peel strength is defined as the average equilibrium force required to peel the three centimeter wide strip of interlayer from the glass.

It is well known that the measured adhesion in such a test will be influenced by the thickness of the specimen of sheeting on which the measurement is made. While this invention is not restricted to sheeting of any particular thickness, it, nevertheless, is convenient to normalize the results of the adhesion measurement to sheeting of a standard reference thickness. By so doing, the reported adhesion measurement thereby provides a characterization of the surface of the sheeting and is independent of the thickness of the particular sample employed in the test. For the present purpose, 15 mils has been selected as the reference thickness for reporting results of the adhesion test since this is a thickness in which polyvinyl butyral sheeting is commonly available commercially.

The adhesion of polyvinyl butyral sheeting of any thickness, $t$, may be normalized to the reference thickness of 15 mils by use of the expression $$A_{15} = A_t \left(\frac{15}{t}\right) 0.65$$

where $A_{15}$ = adhesion normalized to a reference 15 mil thickness,
$A_t$ = adhesion measured on sheeting of thickness $t$, and
$t$ = thickness of the sheeting in mils.

This expression has been established by measuring the adhesion of composite sheeting prepared from multiple layers of 15 mil thick sheeting, both untreated and treated by the process of this invention to various levels of adhesion. This expression is valid over the range of about 10 to 100 mils. All adhesion measurements reported hereinafter have been normalized to a sheeting thickness of 15 mils.

The sheeting of this invention has on one or both sides a normalized adhesion to glass of between about 1 and about 9 lbs. pull per 3 cm. strip at a moisture content of 0.3 percent by weight water when laminated and tested under the conditions specified in the adherence test. The sheeting of this invention has a normalized adherence to glass of between 1 and 9 lbs. pull per 3 cm. strip throughout the moisture content range of 0.2 to 1.4 percent by weight water. Any preselected value for adhesion from 1 to 9 lbs. per 3 cm. strip can be obtained through adjustment of the treating conditions.

In order to demonstrate the difference in resistance to penetration of safety glass laminates, the following laminate preparation procedure and head-form impact test are employed.

Untempered plate glass of nominal 0.125 in. thickness, 14¼ in. wide by 43¼ in. long is washed thoroughly with a detergent solution at a temperature of about 150° F. The washed glass is rinsed with demineralized water and is dried.

The polyvinyl butyral sheeting of known thickness to be used in the laminate is cut to a size of 14¼ in. x 43¼ in., and is washed thoroughly to remove sodium bicarbonate powder and any contamination from the surface. The sheeting is then rinsed with demineralized water. The surface moisture on the sheeting is removed by suspending the sheeting at about 20° C. in a 20–50 percent relative humidity atmosphere until the surface is dry. The sheeting is conditioned at 70° F. in an appropriate relative humidity environment until the desired moisture content is obtained in the sheeting.

The sheeting at temperature of about 70° F. is laid between two pieces of the previously washed and dried glass to form a sandwich. The glass temperature during this operation normally is about 130° F. because of residual heat in the glass from the washing operation.

The sandwich is passed through a pair of rubber covered rolls in order to provide a preliminary bond between the interlayer and the glass. The roll pressure is maintained as high as possible without causing the glass to crack. The maximum pressure which can be used depends upon the softness of the rubber roll and the flatness of the glass. Typically, the rolls are adjusted to exert a force of from 10 to 60 pounds per lineal inch of contact with the glass. The rolled sandwich, commonly called a prepress, is placed in an oven for a length of time sufficient to bring the temperature of the glass to 170° F. The heated prepress then is again rolled in a manner identical to that previously described.

The finished prepress is placed in an air autoclave in which it is heated to a temperature of 150° C. The rate of heating is adjusted so that approximately 75 minutes are required to bring the autoclave up to the temperature of 150° C. The pressure in the autoclave is increased to 50 p.s.i. as soon as the autoclave is closed after the laminate is inserted. The pressure is increased to 150 p.s.i. when the temperature reaches 100° C. The temperature is maintained at 150° C. for 30 minutes after which time the temperature is reduced over a period of 55 minutes to about 20° C. at which time the pressure is reduced and the laminate is removed from the autoclave.

The head-form impact test consists of dropping a 22 lb. hardwood missile from various heights onto the center of the 14¼ in. x 43¼ in. laminate. The missile is in the shape of a human head 7⅞ in. in diameter with an attached wooden beam 18 x 4 x 4 inches long representing the shoulders. The head-form is padded with one wrap of ⅛ in. thick felt. The laminate is supported solely by its outer 1 9/16 in. edges in a horizontal position by a flat rubber gasket 1 9/16 in. wide and ¼ in. thick, having a durometer hardness of 45–55. The rubber gasket is supported on a steel frame. An identical rubber gasket is placed on top of the laminate, and a mating metal frame clamped securely in place by 4 C clamps, spaced near the corners of the frame. Two 29 lb. weights are placed on the top frame. These weights aid in holding the mated metal frames together. By this clamping method the laminate will not pull from between the rubber gaskets when they are impacted with the 22 lb. missile from a height of about twenty feet.

The procedure used in conducting the impact tests is as follows:

(1) The laminates are conditioned in a circulating water bath for four hours at 20° C.

(2) The support frame is cleaned of any glass particles.

(3) An initial drop height is selected based on the expected break point of the material under test.

(4) The laminate is removed from the conditioning bath, placed in the frame, and the missile immediately dropped.

(5) The tested laminates are graded as "penetrations" whenever the missile passes through the laminate or whenever the glass has cracked and the plastic interlayer has torn along the crack in a radial direction from the point of impact for a distance of more than about 5 inches. Other cases are graded as "supports."

(6) If a test results in a "penetration," the succeeding test is from a height lower by an interval "I" than the first test. If a test results in a "support," the next test is from a height higher by "I" feet. The interval "I" is generally chosen to be four ins. for this test.

(7) At least 15 identically prepared laminates normally are tested.

The 50 percent penetration height, i.e., the height at which 50 percent of the laminates are penetrated, is calculated in the following manner:

$$\overline{X} = H_0 + I\left(\frac{\epsilon iN}{\epsilon N} + \frac{1}{2}\right) \text{ if supports are tabulated}$$

$$\overline{X} = H_0 + I\left(\frac{\epsilon iN}{\epsilon N} - \frac{1}{2}\right) \text{ if penetrations are tabulated}$$

where:

$X$ = 50% penetration height,
$H_0$ = the lowest height tested,
$I$ = height interval used,
$i$ = integer corresponding to height intervals (0 at $H_0$, 1 at $H_1$, etc.),
$N$ = number of supports or penetrations at each interval.

The formula for supports is used when there are fewer supports than penetrations; the formula for penetration is used when there are fewer penetrations than supports.

The 50 percent penetration height of a laminate is dependent upon the thickness of the interlayer that is employed, as well as being dependent upon the adhesion between the interlayer and the glass. As expected, the penetration height is increased as the interlayer thickness is increased. This invention is not restricted to sheeting of any particular thickness, and the process of this invention may be applied to sheeting of a wide range of thicknesses. Typically, the thickness of the sheeting will range from about 10 mils to about 60 mils; however, the sheeting of this invention is not limited to this range of thickness.

The sheeting of this invention when laminated at a moisture content of 0.3 percent by weight water, and tested under the conditions specified in the head-form impact test, has, at a tensile strength between about 2500 and 6000 p.s.i., a 50 percent penetration height which is related to thickness in accordance with the equation:

$$PH \geq 15.9 e^{0.0555t}$$

wherein $PH$ = the 50% penetration height in inches,
$e$ = base of natural logarithms,
$t$ = interlayer thickness in mils.

Furthermore, the sheeting of this invention has a 50% penetration height which is given by this equation throughout the moisture content range of 0.2 to 1.4 percent by weight water. The penetration height can be controlled by adjustment of the treating conditions to any preselected value up to about $48 e^{0.0555t}$.

The sheeting of the invention has the further characteristic of having a decreased tendency to block. "Blocking" is the tendency of sheets to adhere to each other. Blocking is measured by the force required to pull apart clean (powder free) sheets of a specified surface pattern and known thickness at a constant rate of 20 inches per minute that have been stored at 20° C. at a relative humidity of 18% under a load of 0.36 p.s.i. for 30 minutes. The degree of blocking is expressed herein as the average force required to peel the specimens apart per inch of width.

Blocking is dependent upon the surface pattern of the sheeting as well as the physical-chemical properties of the surface. Commercially available sheeting has a wide variety of surface patterns. In order to accurately determine the effect of physical and chemical properties on blocking, it is convenient to standardize the effect of surface pattern; this is accomplished by measuring blocking on a polyvinyl butyral sheeting that has been pressed smooth. Measurements of blocking can be carried out on sheeting which has not been pressed smooth, and the blocking measurement will change with the degree of treatment in the same direction as it does for smooth sheeting.

In order to produce the smooth surface on the sheeting samples to be used for measuring blocking, the sheeting is placed between two layers of 5 mil thick polyethylene terephthalate film sold under the trademark "Mylar," having smooth surfaces, which in turn is placed between two layers of ¼ in. thick glass. The sandwich of glass, polyethylene terephthalate and polyvinyl butyral is then placed in an autoclave under oil at a pressure of 225 lbs. per square inch and a temperature of 138° C. for a hold period of nine minutes. After removing the laminate from the autoclave, the glass and polyethylene terephthalate film are separated from the polyvinyl butyral sheeting and discarded. Any surface pattern originally present on the polyvinyl butyral sheeting is pressed smooth by this treatment. The blocking of the smooth sheeting is then measured as described previously.

The sheeting of this invention has a blocking which varies with thickness according to the following equation:

$$B \leqslant 0.10 e^{0.0203t}$$

where $B$=blocking, pounds,
$e$=base of natural logarithms,
$t$=sheeting thickness, mils.

when measured under the conditions specified in the blocking test. The blocking can be controlled by adjustment of the treating conditions to any preselected value down to about 0.002 pound per inch of width. The blocking measurements set forth herein for the sheeting of this invention are obtained by treating the sheeting and then pressing it smooth.

The sheeting of this invention can be produced under a wide variety of process conditions. See, for example, FIGURE III. The number of linear feet per minute that can be flame treated to give the improved product may be varied over a wide range as long as appropriate compensating adjustments are made in the distance between the surface of the sheeting and the face of the burner, and the size of the flame and the like. In general, the number of linear feet treated per minute will be 10 to 200 ft., and the distance between the sheeting surface and the burner surface will be 5 to 15 millimeters, although the speed of the sheet may be as low as about 2 ft. per minute and as high as 1000 ft. per minute, and the burner to sheeting distance may be shorter than 5 millimeters or greater than 15 millimeters, depending on the size of the flame that is used. In general, the distance will not be less than one-half of the length of the inner cone of the undisturbed flame, and the maximum distance will be such that the sheeting remains within the outer luminous cone of the flame.

Hydrocarbon fuel is the preferred fuel. This may be in the form of natural gas or propane; however, other sources of fuel may also be used. When propane gas is used, the preferred ratio of gas to oxygen in the flammable mixture is from about 0.6 to 1.6 times the stoichiometric requirement. The oxygen may be supplied as air or oxygen enriched air. An important consideration in selecting the composition of the flammable gas mixture is that the flame be uniform and stable. The flow rate of the gas should be sufficient to provide a uniform and stable flame. Typically, the gas rate is between 0.01 and 0.03 s.c.f. per minute of natural gas per inch of width of sheeting being treated. The rollers on which the polyvinyl butyral is flamed are cooled to maintain the temperature of the roller at less than about 80° C. but not below the dew point of the surrounding atmosphere.

When producing the sheeting of this invention by the electrical discharge process of this invention, the sheeting can be mounted on an internally cooled roller electrode, as shown in FIGURE IV, or a continuous strip of plasticized polyvinyl butyral may be passed continuously over the roller electrode in much the same manner as shown in FIGURE I for flame treatment, or alternatively, the sheeting may be passed between multiple pairs of spaced electrodes each similar to those shown in FIGURE IV, or over a single electrode about which are located a multiplicity of electrodes. In any event, the voltage can vary from about 1000 to about 20,000, and the frequency from about 3000 cycles to about one megacycle. The amount of electrical energy to which the sheeting is subjected is believed to be the most significant feature of the treatment. It has been found that between about .1 and 8 watt hours per square foot of sheeting produces the desired effect. Preferably, between about .2 and 2.6 watt hours of power are used to treat each square foot of sheeting. FIGURE VIII graphically illustrates how power input is related to peel strength of a sample containing 1.1% water. The gap between the non-roller electrode and the plasticized polyvinyl butyral sheeting of FIGURE V can vary between about 10 and 100 mil. The speed at which the sheeting is passed between the electrodes can vary over wide limits, for example speeds between 2 and 500 feet per minute have been found satisfactory.

When producing the sheeting of this invention by the infrared radiation process of this invention, the sheeting can be mounted on an internally cooled roller, as shown in FIGURE V and subjected to multiple passes under the infrared heater or a continuous strip of plasticized polyvinyl butyral may be treated with a series of infrared electrical heaters of the type shown in FIGURE V. There are few critical limits on this process, but the sheeting should not be heated to such an extent that sheeting melts. The period of exposure necessary to effect the desired change in the sheeting will, of course, depend upon the intensity of the heating. Preferably, the heating is accomplished in an intermittent manner. This can be accomplished by mounting the sheeting on a roller such as shown in FIGURE V, or by passing a strip of sheeting under a series of spaced heaters. Using a 220 volt, 1500 watt heater and a spacing between the heater and the sheeting of about 1½ inch, the period of exposure (obtained in an intermittent manner) will vary between about 2½ and about 5 minutes.

Any polyvinyl butyral resins, for example those disclosed in U.S. Patent 2,345,946 to Overbaugh dated April 4, 1944; U.S. Patent 2,442,754 issued to Stamatoff on June 24, 1947; and in U.S. Patent 2,946,711 issued to Bragaw et al. on July 26, 1960, can be satisfactorily treated by the process of this invention. Typically, the resin sheet has a hydroxyl content of 17 to 25 percent, expressed as weight percent of polyvinyl alcohol and contains a plasticizer in the amount of 20 to 50 parts per 100 parts by weight of the polyvinyl butyral. Preferably, the hydroxyl content is 20 to 24 percent, and the amount of plasticizer is 41 to 48 parts. Typical suitable plasticizers are triethylene glycol di 2 ethyl butyrate; dibutyl sebacate; dibutyl "Cellosolve" adipate and triethylene glycol dihexoate.

The plasticized polyvinyl butyral resin may be treated immediately after it is formed, or the polyvinyl butyral resin sheet may be treated after it is relaxed in accordance with the process disclosed in the U.S. Patent 3,068,525 issued to Linton and Munger on December 18, 1962, or the polyvinyl butyral sheeting may be treated at any time prior to being used to form safety glass laminates, in which case the surface treatment may be carried out on a powdered surface: sodium bicarbonate, diatomateous earth, or other suitable powders in amounts up to 15 percent by weight of the sheet are conventionally applied to allow easy separation of the sheeting. The process may also be carried out on dyed or pigmented plasticized polyvinyl butyral sheeting without significant modification of the process. Surface treatment of only one side of the sheeting is effective in obtaining the objects of this invention, only to a more limited degree than treatment on both sides.

In the following examples, which illustrate the invention, all parts and percentages are by weight unless otherwise stated:

*Example I.*—Fifteen mil polyvinyl butyral sheeting the resin content of which contains 22.5% hydroxyl expressed as the weight percent of polyvinyl alcohol, 52 inches wide, covered on its surface with 8 to 11% sodium bicarbonate powder, plasticized with 45 parts triethylene glycol di 2 ethyl butyrate per 100 parts of polyvinyl butyral was treated in an apparatus substantially as shown in FIGURE I under the following condition:

Burner length, inches=52
Burner slit width, inches=0.1
Sheeting speed, f.p.m.=60
Gas rate, s.c.f.m.=0.54
Air rate, s.c.f.m.=9.8
Gas type=propane
Burner to sheeting distance, mm.=9.0
Temp. of treating roll, ° C.=30–35.

This treatment resulted in a change of properties as indicated below.

| | Before treatment | After treatment |
|---|---|---|
| Peel strength, at 0.4% moisture pounds per 3 cm. strip | 12.0 | 6.0 |
| Blocking, pounds per inch | 0.65 | 0.060 |
| 50% penetration height at 0.4% moisture (inches) | 27 | 55 |

*Example II.*—Using the untreated sheeting of Example I and the same flame treating conditions given in Example I, except varying the burner to sheeting spacing, the following results were obtained under the same laminating and impact test conditions.

| Sample | Peel strength at 0.4% moisture lb./3 cm. strip | 50% penetration height at 0.4% moisture (in.) | Burner to sheeting distance, mm. |
|---|---|---|---|
| Untreated PVB sheet | 12.0 | 27 | |
| Flamed PVB sheet | 9.5 | 33 | 12.5 |
| Flamed PVB sheet | 6.0 | 55 | 9.0 |
| Flamed PVB sheet | 2.0 | (¹) | 6.0 |

¹ Over 72.

*Example III.*—The process of Example I was repeated using sheeting the same as in Example I, except that it was 30 mil and 45 mil thick. The properties of the treated sheet are compared below with the properties of the untreated sheeting:

| | Before treatment | After treatment |
|---|---|---|
| Thirty mil: | | |
| Normalized peel strength, pounds per 3 cm. strip at 0.4% moisture | 11.8 | 5.0 |
| Blocking, pounds per inch | 1.10 | 0.065 |
| 50% Penetration height at 0.4% moisture, inches | 71 | 260 |
| Forty-five mil: | | |
| Normalized peel strength, pounds per 3 cm. strip at 0.4% moisture | 12.0 | 5.2 |
| Blocking, pounds per inch | 1.90 | 0.090 |
| 50% Penetration height at 0.4% moisture, inches | 150 | (¹) |

¹ Greater than 310 inches (limited by test equipment).

*Example IV.*—To further illustrate the reductions in blocking which are obtainable, untreated sheeting as described in Example I and similar sheeting having thicknesses of 30 and 45 mil, was flame treated by the method described in Example I, over a range of burner-to-sheeting distances. The reduction in and the control over blocking which is obtained is shown by the following experimental results:

| Normalized peel strength at 0.4% moisture lb./3 cm. strip | Mil | Blocking pounds per inch |
|---|---|---|
| 2.0 | 15 | 0.035 |
| 6.0 | 15 | 0.060 |
| 6.8 | 15 | 0.072 |
| 12 (not flame treated) | 15 | 0.65 |
| 12.5 (not flame treated) | 30 | 1.30 |
| 6.0 | 30 | 0.090 |
| 12.0 (not flame treated) | 45 | 1.80 |
| 5.2 | 45 | 0.089 |

*Example V.*—The untreated sheeting of Example I was flame treated as in Example I and conditioned at 20% relative humidity and laminated between 12 inch by 12 inch glass using an autoclave under oil pressure of 225 pounds per square inch and a temperature of 138° C. for a hold period of 9 minutes. These laminates are all tested by dropping a ½ pound spherical steel ball from various heights onto the center of the laminates in the manner described in the "American Standard Safety Code for Safety Glazing Materials for Glazing Motor Vehicles Operation on Land Highways," Z26.1–1950, except that the laminates are tested at a temperature of −18° C. A test interval of 2–3 feet is normally used. Otherwise, the test procedure and calculations of the penetration height are identical to Example I.

Results on various types of sheeting are summarized below:

| Sample | Peel strength lb./3 cm. strip | Small missile 50% penetration height, feet | Moisture, percent |
|---|---|---|---|
| Untreated | 12.0 | 17 | 0.4 |
| Flamed both surfaces | 8.0 | 27.5 | 0.4 |
| Flamed both surfaces | 6.0 | (¹) | 0.4 |
| Flamed both surfaces | 2.0 | (¹) | 0.4 |
| Flamed one surface only | ²6.0 | | |
| Impacted on treated surface | | 23 | 0.4 |
| Impacted on untreated surface | | 28 | 0.4 |

¹ Over 50.
² Treated side.

This demonstrates that flame treating only one surface improves small missile penetration, but to a lesser extent than when both surfaces are treated.

*Example VI.*—A series of measurements of peel strength were made over a range of moisture contents on untreated 15 mil sheeting of Example I flame-treated in varying amounts. The results are tabulated below:

| Sample No. | Moisture content | Peel strength (lb./3 cm.) |
|---|---|---|
| 1 | 0.2 | 7.6 |
| | 0.9 | 7.5 |
| | 1.3 | 5.7 |
| 2 | 0.2 | 9.0 |
| | 0.9 | 8.9 |
| | 1.3 | 6.9 |
| 3 | 0.2 | 1.8 |
| | 0.9 | 1.9 |
| | 1.4 | 3.8 |

This series of runs shows that the process of this invention can be used to produce a sheeting that has an adhesion to glass of less than about 9 lbs./3 cm. throughout the moisture content range of 0.2 to 1.4 percent moisture. In contrast, commercially available sheeting cannot be reduced to an adhesion value of less than 9 lbs. pull/3 cm. without increasing the moisture content above about 1.4%.

*Example VII.*—A series of measurements were made of tensile strength of untreated and flame treated plasticized polyvinyl butyral sheeting. The results are tabulated below:

| Sample No. | Peel strength at 0.4% moisture lbs./3 cm. | Tensile strength, p.s.i. |
|---|---|---|
| 1—Untreated | 12 | 3,099 |
| Treated | 5 | 3,058 |
| 2—Untreated | 12 | 3,178 |
| Treated | 5 | 3,071 |
| 3—Untreated | 12 | 3,800 |
| Treated | 2 | 3,757 |
| Treated | 8 | 3,711 |

The tensile strength was measured in accordance with the procedure outlined above in connection with FIGURE VII. It can be seen that the treating does not substantially affect the tensile strength of the samples.

*Example VIII.*—To illustrate the different types of flame treating conditions that may be used to produce the sheeting of this invention, the untreated sheeting of Example I was treated under a wide variety of conditions with the results set forth below.

| Test Number | 1 | 2 | 3 | 4 | 5 | 6 |
|---|---|---|---|---|---|---|
| Burner length, inches | 52 | 52 | 52 | 52 | 12 | 12 |
| Burner width, inches | 0.1 | 0.1 | 0.1 | 0.1 | 1.0 | 1.0 |
| Sheeting speed, f.p.m | 60 | 60 | 200 | 68 | 45 | 45 |
| Gas rate, s.c.f.m | 0.64 | 0.90 | 0.54 | 0.54 | 0.2 | 0.2 |
| Air rate, s.c.f.m | 11.0 | 13.5 | 9.8 | 9.8 | 1.5 | 1.28 |
| Oxygen rate, s.c.f.m | 0.59 | 1.27 | 0 | 0 | 0 | 0 |
| Stoichiometric ratio of gas to oxygen | 1.1 | 1.1 | 1.3 | 1.3 | 1.2 | 1.5 |
| Gas type | (1) | (1) | (1) | (1) | (2) | (2) |
| Burner to sheeting distance, mm | 10.0 | 3.0 | 9.0 | 5.0 | 13.0 | 13.0 |
| Peel strength, at 0.4% moisture lb./3 cm. strip | 6.2 | 1.4 | 6.0 | 9.0 | 5.7 | 7.6 |

1 Propane.
2 Natural gas.
The peel strength of untreated sheeting is about 13 lbs. per 3 cm. strip.

*Example IX.*—The untreated sheeting described in Example I was treated under varying conditions of sheeting speed and burner to sheeting distance; the results obtained under the following conditions are plotted in FIGURE III.

Moisture content of peel strength samples,
percent _____ 0.4
Burner length, inches _____ 52
Burner width, inches _____ 0.1
Gas rate, s.c.f.m. _____ 0.54
Air rate, s.c.f.m. _____ 9.8
Gas type, propane.

*Example X.*—If sheeting is flame treated under the same condition given in Treatment 5 of Example VIII except that the surface is rinsed free of sodium bicarbonate powder, the peel strength reduction is slightly greater as indicated below:

| | Peel strength lb./3 cm. strip | Percent moisture in peel laminate |
|---|---|---|
| Powered sheet | 5.7 | 0.40 |
| Sheet free of powder | 4.3 | 0.40 |

*Example XI.*—A reduction in adhesion also is obtained by flame treating sheeting which previously has been dyed. This is illustrated by the following example.

The untreated sheeting described in Example I was tinted with an oil soluble dye of the type disclosed in U.S. Patent 3,008,855, issued November 14, 1961 to Blake et al., and coated on its surfaces with 8 to 11 percent of sodium bicarbonate powder and passed through a flame under the following conditions:

Burner length—12 inches
Burner width—1.0 inch
Sheeting speed—45 feet per minute
Gas rate—0.2 s.c.f.m.
Air rate—1.28 s.c.f.m.
Gas type—natural gas
Burner to sheeting distance—11.0 mm.

The peel strength of the treated sheeting at 0.4% moisture is:

Clear area=7.3 pounds/3 cm. strip,
Tinted area=9.0 pounds/3 cm. strip.

The peel strength of untreated sheeting is about 13 lb./3 cm. strip at 0.4 moisture.

*Example XII.*—The untreated powdered sheeting described in Example I was flame treated and tested under the same conditions used in Example I. That the 50% penetration height is substantially unaffected by different moisture contents is illustrated by the following results:

| Sample | Peel strength lb./3 cm. strip at 0.4% moisture | 50% penetration height (in.) | Moisture content, percent in break height laminate |
|---|---|---|---|
| Flamed PVB Sheet | 6.5 | 44 | 0.9 |
| Flamed PVB Sheet | 6.5 | 42 | 0.25 |

*Example XIII.*—The untreated sheeting of Example I, rinsed free of sodium bicarbonate powder, was treated in a high voltage electrical discharge apparatus similar to that shown in FIGURE V.

The electrode 15 was a concave shaped brass electrode 30 inches long and 3 inches wide, and the treatment roll is wrapped with a 4 to 6 mil buffer layer of polyethylene terephthalate film. The above sheeting was treated under the following conditions.

Sheeting speed, f.p.m.=10
Frequency kilocycles=9
Output power, watts=2000
Air gap between electrode and sheeting, mils=30
Treatment roll temp., °C=20

The sheeting passed under the electrode 15 once and absorbed about 1.33 watt hours of energy per square foot.

In this treatment the sheeting width extended one inch or more beyond each end of the electrode to prevent electrical arcing from the end of the electrode to the treatment roll. The following change in properties resulted from this treatment:

| | Before treatment | After treatment |
|---|---|---|
| Peel strength, lbs./3 cm. strip at 0.4% moisture | 12.0 | 5.6 |
| Blocking, pounds | 0.65 | 0.056 |
| 50% penetration height, at 0.4% moisture (inches) | 27 | 55 |

*Example XIV.*—The untreated sheeting of Example I was treated by the method described in Example XIII over a range of sheeting speeds and power output levels. The results of this treatment on peel strength are given in FIGURE VIII where peel strength is correlated with power input per square foot of sheeting.

*Example XV.*—The untreated sheeting of Example I rinsed free of sodium bicarbonate powder was treated under the conditions of Example XIII except that sheeting speed was decreased to 9 feet per minute. The sheeting in one pass under the electrode absorbed about 1.48 watt hours of energy per square foot. This treatment resulted in the following changes in properties of the sheeting.

|  | Untreated sheeting | Treated sheeting |
|---|---|---|
| Peel strength, lbs./3 cm. strip at 0.4% moisture | 12.0 | 4.5 |
| Blocking pounds | 0.65 | 0.046 |
| 50% penetration height at 0.4% moisture | 26 | 96 |

*Example XVI.*—The untreated sheeting of Example I was treated with the electrical discharge of a high frequency tesla coil generator under the following conditions:

Electrode: ½ in. aluminum rod 16 inches long
Treatment roll: 6 in. diameter roll covered with 12–15 wrap of 2 mil polyethylene terephthalate film
Electrode-sheeting air gap: 0.100 in.
Power output: 1200 watts
Sheeting speed: 13.7 ft./min.

The sheeting was passed one time under the electrode and absorbed about 1.17 watt hours of energy per square foot. This treatment reduced the peel strength of the sheeting at a moisture content of 0.4% moisture from 12.0 lbs./3 cm. strip for untreated to 6.6 lbs./3 cm. strip for the treated sheeting.

*Example XVII.*—The untreated sheeting of Example I, both powdered and rinsed free of powder, was treated under conditions described in Example XIII except that sheeting speed was varied over a four-fold range. The results of this treatment on peel strength are shown in the following table:

| Sheeting speed, f.p.m. | Power output watt-hours/ft. | Peel strength at 0.4% moisture | |
|---|---|---|---|
| | | Unpowdered sheeting | Powdered sheeting |
| 5.5 | 2.91 | | 5.8 |
| 10.3 | 1.17 | 5.0 | 6.6 |
| 19.4 | 0.83 | 6.0 | 8.8 |

*Example XVIII.*—A 7 by 7 inch sample of the untreated sheeting of Example I was subjected to infrared heating by use of an apparatus such as that illustrated in FIGURE V. The infrared heater was a 220 volt, 1500 watt single element, tubular resistance heater with a reflector. The roller to which the sheeting was attached was rotated at a circumferential speed of 45 ft./min. The sheeting was the same as that treated in Example I. The spacing between the heater element and the sheeting was about 1½ inch. The results were as follows:

| Sheeting treatment | Peel strength at 0.4% moisture lb./3 cm. | Blocking, lbs. |
|---|---|---|
| None | 10.5 | 0.65 |
| 70 passes | 6.8 | 0.072 |
| 35 passes | 7.9 | 0.090 |

What is claimed is:

1. In a process for the preparation of plasticized polyvinyl butyral sheeting suitable for use in the preparation of laminated safety glass, the step which comprises flaming at least one surface of a plasticized butyral sheeting.

2. The process of claim 1 in which the flame is produced by burning a mixture comprising a hydrocarbon fuel gas and an oxygen-containing gas.

3. The process of claim 1 in which the sheeting is passed over and is supported by a rotatable roll as the sheeting is passed through the flame, the roll being cooled to a temperature below 80° C. and above the temperature corresponding to the dew point of the surrounding atmosphere.

4. A process for the production of a plasticized polyvinyl butyral sheeting having a normalized adhesion to glass of between 1 and 9 pounds per 3 centimeters at a moisture content of 0.3 percent by weight of the plasticized sheeting, and when laminated and tested under the conditions specified in the head-form impact test having a 50% penetration height which is related to sheeting thickness in accordance with the equation:

$$PH \geq 15.2e^{0.0555t}$$

where $PH$ = 50% penetration height, $e$ = base of natural logarithms and $t$ = sheeting thickness in mils, and by having a tensile strength between 2500 and 6000 p.s.i. and a blocking which varies with the thickness in accordance with the equation:

$$B \leq 0.10e^{0.0203t}$$

where $B$ = blocking in pounds, $e$ = base of natural logarithms, and $t$ = sheeting thickness in mils, which comprises flaming both surfaces of a plasticized polyvinyl butyral sheeting by passing the sheeting at a distance from the flame source that it is within the outer luminous cone of a flame at a speed of between 2 and 1000 feet per minute.

5. The process of claim 4 in which the sheeting is passed over and is supported by a rotatable roll as the sheeting is passed through the flame, the roll being cooled to a temperature below 80° C. and above the temperature corresponding to the dew point of the surrounding atmosphere.

6. The process of claim 4 in which the plasticized polyvinyl butyral sheeting is coated on its surfaces with sodium bicarbonate powder which comprises less than about 15 percent by weight of the powdered sheeting.

7. The process of claim 4 in which the plasticized polyvinyl butyral sheeting contains coloring matter selected from the class of dyes and pigments.

8. The product obtained by the process of claim 1.

References Cited by the Examiner

FOREIGN PATENTS 828,381  2/1960  Great Britain.

ALEXANDER WYMAN, *Primary Examiner.*

W. J. VAN BALEN, *Assistant Examiner.*